UNITED STATES PATENT OFFICE.

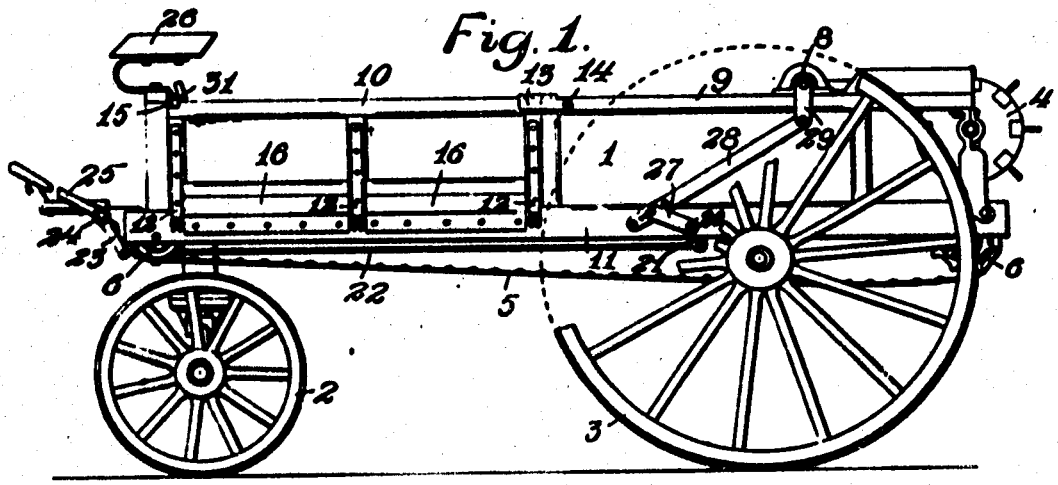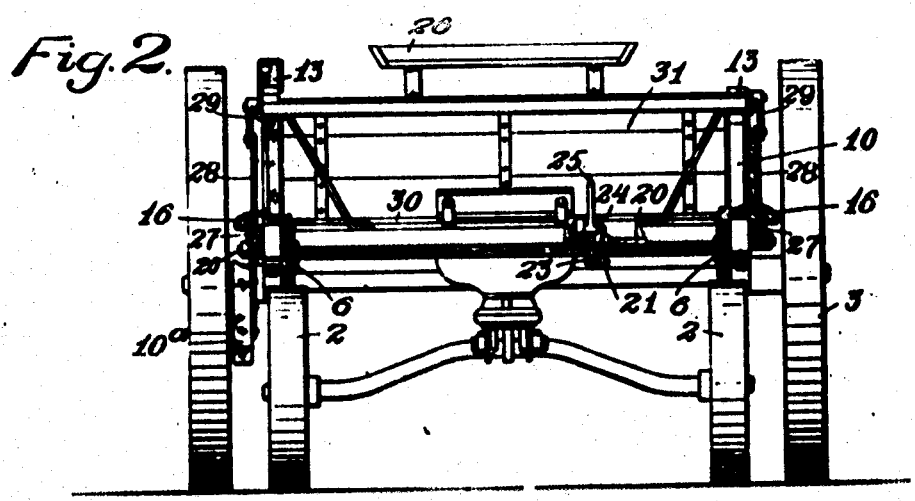

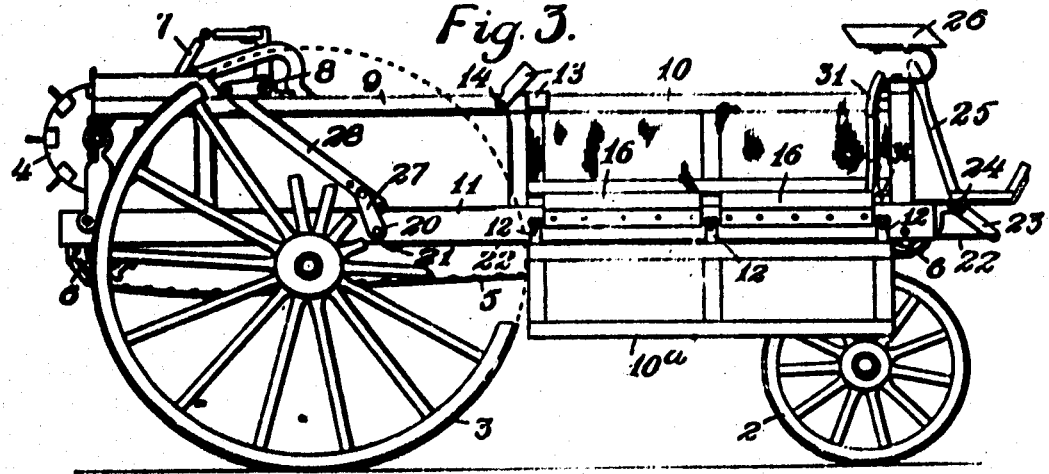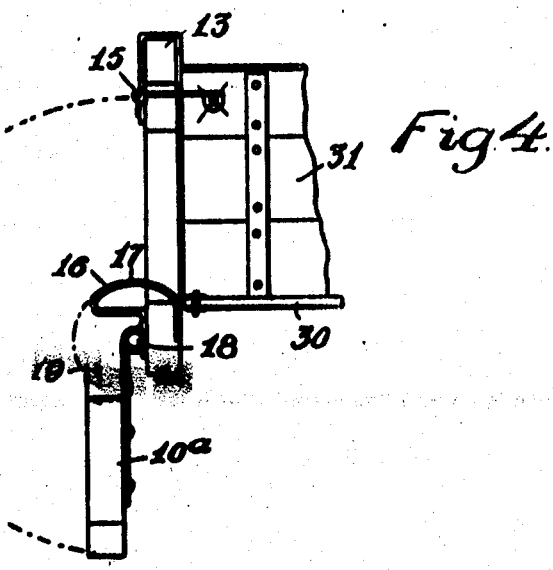

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

946,718.

Specification of Letters Patent.    Patented Jan. 18, 1910.

Application filed November 16, 1908. Serial No. 462,745.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same, in which—

Figure 1 represents in side elevation a manure spreader embodying my present invention, and showing such portions of the operative parts of the spreader as are necessary to illustrate the character of my present invention. Fig. 2 is an end view of the same showing the forward end of the spreader. Fig. 3 is a side view showing the opposite side to that shown in Fig. 1, and Fig. 4 is a diagrammatic view, showing on a larger scale the construction and operation of one of the hinged sides of the body of the manure spreader.

Similar reference figures refer to similar parts in the different views.

The objects of my present invention are to facilitate the loading of the spreader and to provide an operating mechanism for raising and lowering the tail-board which will leave the forward portion of the body free, so that its sides may be raised and lowered, and I accomplish these objects by means of the construction and arrangement of parts as hereinafter described and pointed out in the annexed claims.

My invention relates to that class of manure spreaders which are now in common use, comprising a body mounted upon wheels and having a movable bottom provided with a head-board by which the manure held in the body of the spreader may be gradually moved rearwardly against a revolving beater or cylinder, provided with teeth, by the rapid rotation of which the manure is shredded and distributed rearwardly over the ground as the spreader is drawn through the field.

The manure spreader, as shown in the accompanying drawings, is likewise provided with a tail-board pivotally supported by the sides of the body and arranged to be lowered in position to hold the load of manure from crowding against the beater and raised when the operation of spreading is to begin to allow free passage of the manure against the revolving beater.

Referring to the accompanying drawings 1 denotes the body of the spreader, supported upon forward wheels 2 and rear wheels 3, the latter being operatively connected with the movable parts of the machinery in any suitable manner, as is common in beaters of this class. A revolving beater 4 is journaled at the rear of the body, and a movable bottom has its ends connected by chains 5 which pass over sprockets 6, 6, at the forward and rear ends of the body. A tail-board 7 of the type described in Letters Patent of the United States No. 821,779, issued to me May 29, 1906, is pivotally supported at 8 by the body of the spreader.

Each of the vertical sides of the body is divided into two sections, a fixed or rigid rear section 9 and a hinged forward section 10. The rigid sides 9 extend from the rear end of the body past the rear driving wheels 3, the remaining or hinged portion of the sides 10 extend from the rigid sides to the forward end of the body. Each of the hinged sections are connected with the sill 11 of the body by hinges 12, and is held in a vertical position at its rear end by a latch 13 pivoted to the rigid side 9 at 14. The forward end of the hinged side is held by a latch 15 best shown in Fig. 4.

When the manure spreader is to be loaded the body is placed sidewise to the heap of manure and the adjacent hinged section 10 is released from the latches 13 and 15 and is dropped down, as shown at 10ᵃ in Figs. 2, 3 and 4, allowing the body to be loaded from that side without lifting the manure over the vertical side of the body. In order to prevent the manure from being caught between the edge of the hinged side and the sill of the manure spreader when the side is closed, I provide a threshold 16 which may be made of wood, or as illustrated in the drawings, of sheet metal, having its upper surface 17 curved concentrically with the pivot 18 of the hinged side, and the contacting edge of the hinged side is similarly curved, as shown at 19, Fig. 4, so that when the side is raised into its vertical position the curved surface 19 will slide over the curved surface 17 of the threshold and crowd the manure resting thereon before it into the body of the spreader.

In order to provide operative mechanism for raising and lowering the tail-board which will not interfere with the hinged sides of the body, I journal a transverse shaft 20 at the rear of the hinged sections 10, which is connected by a radial arm 21 and link 22, with a lever 23 pivoted at 24 and extended to form a lever handle 25 in convenient position to be operated by the driver from the seat 26. The ends of the transverse shaft 20 are provided with radial arms 27 which are connected by links 28 with radial arms 29, attached to the outer ends of the gudgeons or pivots 8 which support the tail-board 7. By raising the lever handle 25 from the position shown in Fig. 1 to that shown in Fig. 3, the transverse shaft 20 will be rocked, causing the tail-board to be raised from its lowest position, as shown in Fig. 1, to its highest position, as shown in Fig. 3.

The beater 4 is journaled in bearings held in fixed positions by means of rigid supports, in the present instance, by the rigid sections 9 of the upright sides. The beater supports, however, are not necessarily connected with the rigid sections 9, but the bearings may be held by any suitable rigid supports rearward of the removable sections 10. While I deem it preferable to hinge the sections 10 to the sill of the body, any construction which will render the sections 10 removable from their normal upright position would come within the scope of my present invention, as it would enable the spreader to be loaded without raising the manure over the upright sides of the body.

The movable bottom 30, having its ends connected by chains 5, carries a headboard 31 and, by means of a crank applied to the shaft of one of the sprockets 6, as is now the common practice, the bottom 30 and headboard 31 may be moved toward and away from the beater. When the space between the removable sides 10 has been filled, the bottom 30 and headboard 31 may be cranked rearwardly, thereby pushing the load between the upright rigid sections 9. By restraining the load from returning, which may be conveniently done by temporarily holding a board in front of the load, the movable bottom may be cranked forward returning the headboard 31 to its normal position. This operation shifts the manure already loaded to the rearward and empties the space between the removable sections 10, when the operation of loading may be continued.

I claim,

1. A manure spreader comprising a body with upright sides, a movable bottom and a beater at the rear of said body, with a portion of said upright sides removable, whereby manure may be loaded on said movable bottom in a position to be moved by said bottom toward said beater.

2. A manure spreader comprising a body with upright sides, a movable bottom and a beater at the rear of said body, with the forward portion of said upright sides removable, whereby manure may be loaded on said bottom in the forward portion of said body and moved by said bottom toward said beater.

3. A manure spreader comprising a body with upright sides and a movable bottom with the forward portion of said upright sides removable, whereby manure may be loaded on said bottom in the forward portion of the body and moved by said bottom toward the rear of the body.

4. A manure spreader comprising a body with upright sides and a movable bottom, with the forward portion of said upright sides hinged at the lower edge, whereby said portion may be swung outwardly to allow manure to be loaded on said bottom in the forward portion of said body and moved by said bottom toward the rear of the body.

5. A manure spreader comprising a body with upright sides and a movable bottom, with a portion of each side hinged at its lower edge and a threshold for each hinged portion to prevent the entrance of manure beneath said hinged portion while said bottom is in motion.

6. A manure spreader comprising a body with upright sides and a movable bottom, with a portion of each side hinged at its lower edge, and means for preventing the entrance of manure beneath said hinged portion while said bottom is in motion.

7. A manure spreader having a movable bottom, a beater at the rear of said bottom, and confining walls on either side of said bottom to prevent the sidewise movement of manure from said bottom, with a portion of said walls removable to provide for the loading of manure on said bottom while said bottom is at rest.

Dated this 14th day of November 1908.

THEOPHILUS BROWN.

Witnesses:
RUFUS B. FOWLER,
PENELOPE CUMBERBACH.